(12) United States Patent
Ranganathan

(10) Patent No.: US 7,519,794 B2
(45) Date of Patent: Apr. 14, 2009

(54) HIGH PERFORMANCE ARCHITECTURE FOR A WRITEBACK STAGE

(75) Inventor: Sridharan Ranganathan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 226 days.

(21) Appl. No.: 11/169,967

(22) Filed: Jun. 29, 2005

(65) Prior Publication Data

US 2007/0005941 A1   Jan. 4, 2007

(51) Int. Cl.
*G06F 9/30* (2006.01)

(52) U.S. Cl. .................................... 712/218
(58) Field of Classification Search .................. 712/218
See application file for complete search history.

(56) References Cited

U.S. PATENT DOCUMENTS

| | | | | |
|---|---|---|---|---|
| 5,632,023 A | * | 5/1997 | White et al. | 712/218 |
| 5,778,245 A | * | 7/1998 | Papworth et al. | 712/23 |
| 6,530,014 B2 | * | 3/2003 | Alidina et al. | 712/221 |
| 6,826,678 B2 | * | 11/2004 | Le et al. | 712/218 |
| 6,883,089 B2 | * | 4/2005 | Kling et al. | 712/216 |
| 7,024,542 B2 | * | 4/2006 | Savransky et al. | 712/218 |

OTHER PUBLICATIONS

Todd Basso, A microarchitecture for high speed, resource limited, superscalar microprocessors, Oct. 30, 1997, Ph.D. Thesis proposal.*
Johnson, Mike. "Superscalar microprocessor design" Prentice Hill, Inc. 1991. pp. 44-53.*
Hennessy, John, Patterson, David. "Computer Architecture: A quantitative approach" Morgan Kaufmann, 3rd edition, May 2002. pp. 226-231.*
"MMX™ Microarchitecure of Pentium® Processors With MMX Technology and Pentium® II Microprocessors" Michael Kayan et al. Intel Technology Journal Q3, 1997. ftp://download.intel.com/technology/itj/g31997/pdf/micro.pdf.
Architecture of the Intel® MXP5800 Digital Media Processor, Lou Lippincott, Arup Gupta, Glenda Dorchak. Aug. 2004. http://www.hotchips.org/archives/hc16/2_Mon/14_HC16_Sess3_Pres2_bw.pdf.

* cited by examiner

*Primary Examiner*—Eddie P Chan
*Assistant Examiner*—Jacob Petranek
(74) *Attorney, Agent, or Firm*—Trop, Pruner & Hu, P.C.

(57) ABSTRACT

In one embodiment, the present invention includes an apparatus that has a plurality of buffers to store data resulting from operations of a processor pipeline, a pointer storage to store pointers, where each of the pointers is to point to one of the buffers, and one or more resources coupled to the buffers to receive the data stored in the buffers. Other embodiments are described and claimed.

22 Claims, 4 Drawing Sheets

HIGH PERFORMANCE ARCHITECTURE FOR A WRITEBACK STAGE

BACKGROUND

Embodiments of the present invention relate to processing data, and more particularly to processing data in a processor pipeline.

Instructions executed in a pipelined manner within a processor such as a microprocessor can have different latencies, as different instructions may require different cycles to complete. As an example, multiply-accumulate or divide operations may be pipelined into multiple execution paths of an execute stage for purposes of power and timing convergence. These instructions consume different amounts of cycles to execute, and thus have varying latencies.

In processor pipelines that support instructions of varying latencies, resource hazards may occur. A resource hazard occurs when multiple instructions or data thereof seek to use the same resource within a single cycle. Most architectures handle resource hazards by disallowing their occurrence by labeling the hazards as illegal. Such restrictions place a burden on software, including a compiler or assembler, and/or a programmer developing code. Additional overhead may be consumed and performance affected by requiring modifications to assembly code to overcome such resource hazards.

A stall is another event that can impact processor performance. Stalls occur when a pipeline stage signals to other stages to stop executing for one or more cycles so that the stage requesting the stall can "catch up". Such stalls negatively impact performance.

A need thus exists to more efficiently handle instructions of varying latencies and to reduce resource hazards and stalls, particularly in light of non-uniform pipeline latencies.

DETAILED DESCRIPTION

Embodiments of the present invention may include a writeback stage of a processor pipeline that can handle receipt of multiple write data in a single cycle. In such manner, data from different branches of an execution stage to which the writeback stage is coupled may be provided to the writeback stage within one or more cycles without causing a stall or resource hazard within the pipeline. Accordingly, restrictions associated with resource hazards such as multiple writeback operations may be reduced, improving performance and programmability of an instruction set architecture (ISA) in accordance with an embodiment of the present invention.

Figure 1:
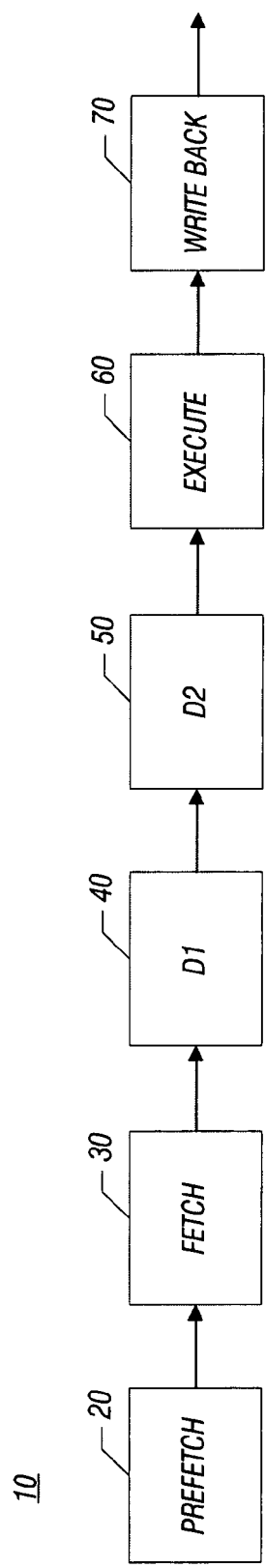
FIG. 1 is a block diagram of a processor in accordance with one embodiment of the present invention.

Embodiments may be used to enable data with different instruction latencies that exit the execution stage during a single cycle to be handled by the writeback stage without causing a stall. Referring now to FIG. 1, shown is a block diagram of a processor 10 in accordance with one embodiment of the present invention. As shown in FIG. 1, processor 10 may be a multi-stage pipeline processor. In the embodiment shown in FIG. 1, processor 10 is a six-stage processor although the scope of the present invention is not so limited.

Processor 10 includes a prefetch stage 20 that prefetches instructions from a memory. Prefetched instructions are provided to a fetch stage 30, where the instruction bytes are parsed into instructions and any prefixes are decoded. From fetch stage 30, the instructions are provided to a first decode (D1) stage 40. A second decode (D2) stage 50 is coupled to D1 stage 40. Together, these stages decode the instructions and provide them to an execute stage 60 (also referred to herein as an "execution stage") for processing.

As will be described further below, execute stage 60 may include multiple branches to handle the processing of different instructions, such as addition instructions, multiply instructions, multiply-accumulate instructions, and store-accumulate instructions, for example. After performing a decoded instruction, which may take one or more multiple cycles, execute stage 60 provides result data to a writeback stage 70. In various embodiments, writeback stage 70 may include multiple buffers to store incoming result data. Furthermore, writeback stage 70 may include a pointer storage such as a first-in-first-out (FIFO) buffer that acts as a pointer to indicate the location of the next data to be written out of writeback stage 70. While not shown in FIG. 1, it is to be understood that the output of the writeback stage 70 may be coupled to a variety of different resources, such as a register file (RF), a bus, a local memory, or any other desired location for receiving result data.

While described with regard to FIG. 1 as a relatively straightforward six-stage pipeline, it is to be understood the scope of the present invention is not so limited, and a writeback stage in accordance with an embodiment of the present invention may be used with many different kinds of processors having many more stages and functionality, including, for example, in-order processors, out-of-order processors, scalar, superscalar and vector processors, among many others.

By providing multiple buffers within writeback stage 70, multiple write data input into writeback stage 70 from execute stage 60 may be handled in a single cycle. Furthermore, the pointer storage may allow these multiple writes to be output in an appropriate order from writeback stage 70. Still further, writeback stage 70 may include logic to determine if it is necessary to stall the processor pipeline and if so, stall it in an optimal manner.

Figure 2:
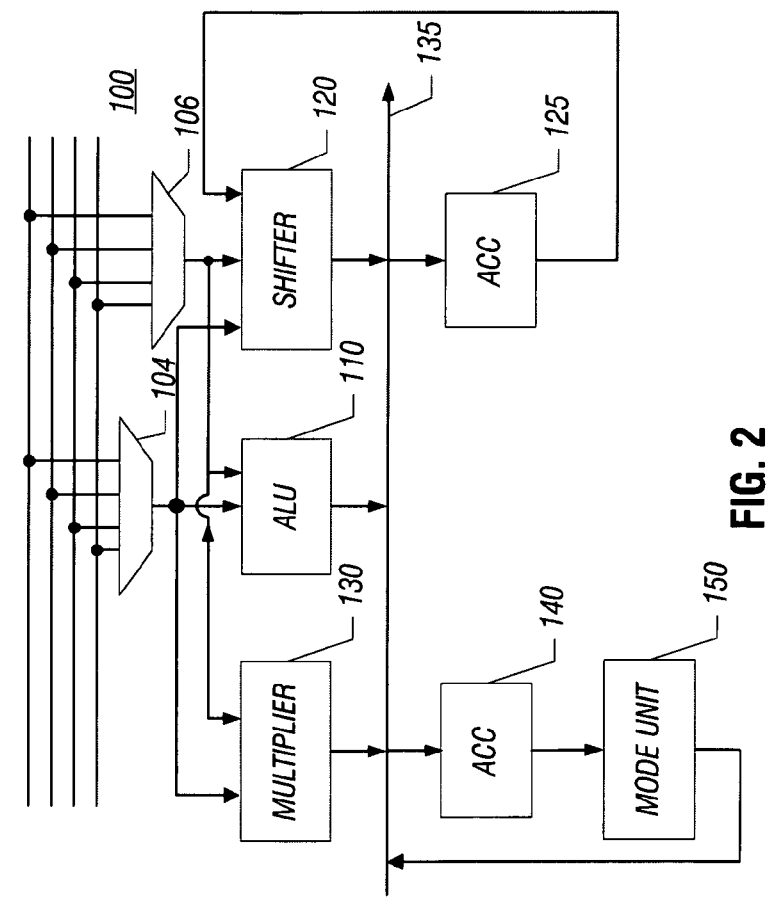
FIG. 2 is a block diagram of an example execution stage of a processor in accordance with one embodiment of the present invention.

Referring now to FIG. 2, shown is a block diagram of an example execution stage of a processor in accordance with one embodiment of the present invention. As shown in FIG. 2, execution stage 100 may include multiple branches to perform execution of instructions in parallel. As shown in FIG. 2, these parallel execution branches include an arithmetic logic unit (ALU) 110, a shifter 120 to which is coupled an accumulator (ACC) 125, and a multiplier 130 to which is coupled an accumulator 140 and a mode unit 150. It is to be understood that execution stage 100 is exemplary, and variations and alternatives are within the scope of the present invention.

Incoming data to execution stage 100 may come from various sources, including a register file (either locally or globally), a bus, or other sources. The incoming data is coupled to a first multiplexer 104 and a second multiplexer 106, which are controlled to select the desired inputs to the appropriate branches of the execution stage based on instructions or other control. Accordingly, incoming data to be processed may be provided to one or more of multiplier 130, ALU 110 and shifter 120 from multiplexers 104 and 106.

Depending upon the type of instruction, result data may be output on a bus 135. Also, while shown with a single output bus, it is contemplated that each branch of execution stage 100 may be directly coupled to a writeback stage.

Different latencies may be present before desired result data is available on bus 135 depending upon the type of instruction. For example, in one ISA an addition operation using ALU 110 may be available on bus 135 in four cycles, while a multiply-accumulate instruction may take five cycles to handle. Furthermore, a store-accumulate may consume six cycles to perform the execution, accumulation and mode processing.

Accordingly, based on the type of instruction, result data may be provided to a writeback stage via bus 135 with different latencies. Because of these varying latencies, multiple result data may be available on bus 135 in a single cycle. To accommodate this multiple data, a writeback stage in accordance with an embodiment of the present invention may be used.

Figure 3:
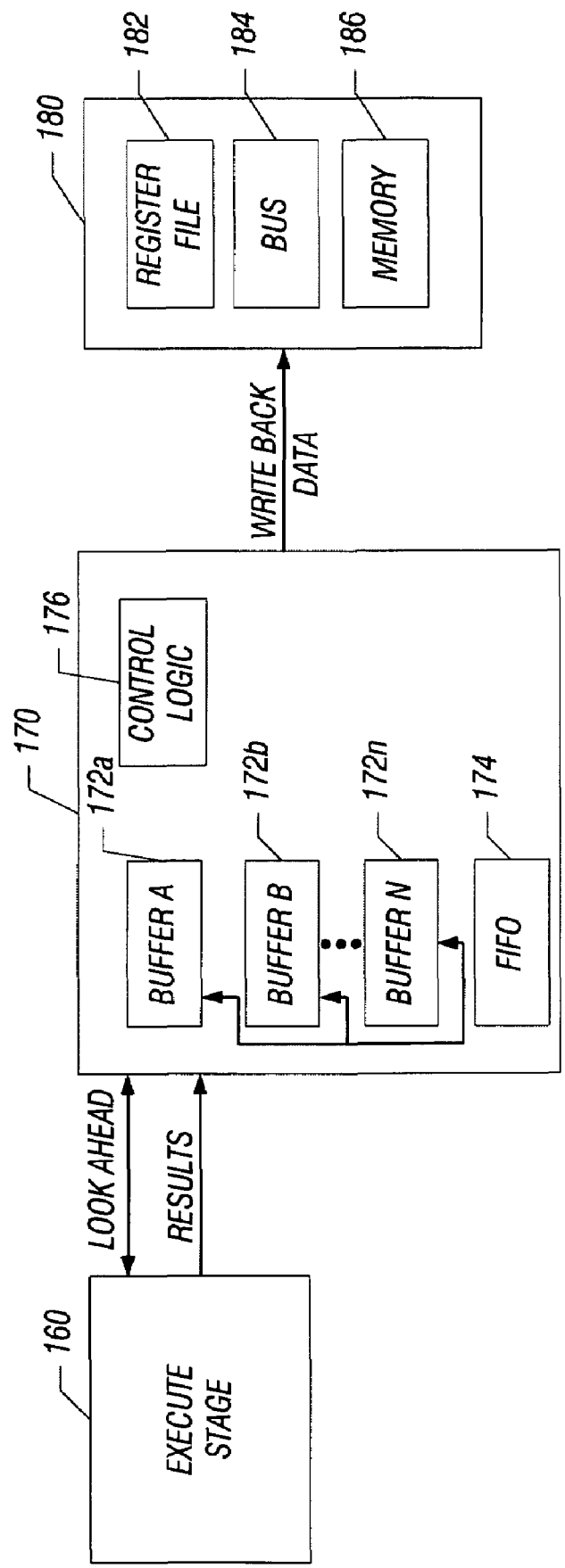
FIG. 3 is a block diagram of a portion of a processor according to an embodiment of the present invention.

Referring now to FIG. 3, shown is a block diagram of a portion of a processor in accordance with an embodiment of the present invention. As shown in FIG. 3, result data from an execute stage 160 may be provided to a writeback stage 170. Writeback stage 170 may include a plurality of buffers 172A . . . 172N. In various embodiments, a buffer may be provided for each pipeline latency possible in an instruction set. As an example, if an instruction set includes three different instruction latencies, three write buffers may be provided. However, in other embodiments a single buffer may be present to store result data of the multiple latencies.

As further shown in FIG. 3, a pointer storage 174, which may be a FIFO buffer, is present to store a pointer for each result data stored in one of buffers 172A-172N. Write buffers 172A-172N may store the details of the result data that is input into writeback stage 170, in addition to the result data. For example, this metadata may include an indication or identifier of the resource (i.e., a resource identifier) to which the data is to be written. FIFO 174 may be used to store pointers that point to the next write to be output by writeback stage 170. Thus, when result data is input into writeback stage 170, an entry (i.e., a pointer) may be stored in FIFO 174 that is associated with the result data. In various embodiments, when more than one write is requested to writeback stage 170 by instructions having different latencies (e.g., in a single cycle), priority may be given to a program order. That is, instructions with a higher latency may be given priority. The priority may be effected by first storing the pointer corresponding to the higher latency instruction ahead of lower latency instruction(s) within FIFO 174. Accordingly, the pointers within FIFO 174 control the order in which result data is output from writeback stage 170.

As further shown in FIG. 3, writeback stage 170 includes a control logic 176 to control operation of the writeback stage and also to determine if it is necessary to stall the pipeline to prevent an overflow condition. In various embodiments, a look-ahead mechanism may be used to determine whether the pipeline should be stalled. Thus as shown in FIG. 3, control logic 176 may use a look-ahead channel between writeback stage 170 and execute stage 160 to prevent overflow conditions. Further details of the look-ahead mechanism will be discussed below.

Still referring to FIG. 3, writeback data output from writeback stage 170 may be provided to one or more resources 180. As shown in FIG. 3, these resources may include, for example, a register file 182, a bus 184, and a memory 186 which may be, for example, a local memory associated with the processor. The writeback data may be directed to one of these resources based on the resource identifier stored with the associated result data in one of buffers 172A-172N.

In various embodiments, a processor may include a plurality of pipelines, for example, an integer pipeline, a floating point (FP) pipeline, and/or multiple such pipelines among others. Furthermore, a processor may include different processing engines each including an execution stage with similar or different functionalities to handle processing of multiple instruction multiple data (MIMD) operations. In various embodiments, bus 184 may be coupled between these multiple pipelines, cores, or processing engines to facilitate rapid access to result data.

Figure 4:
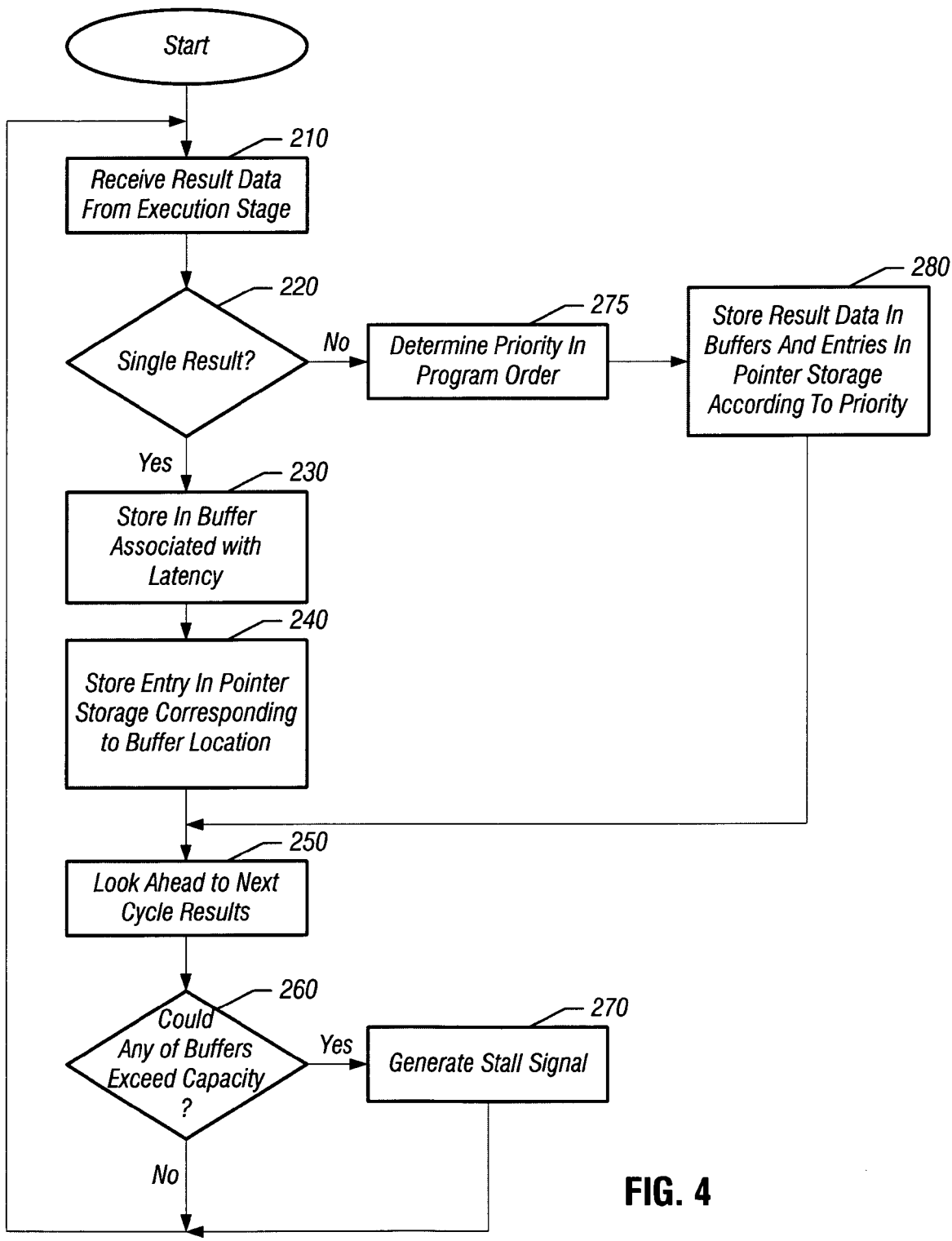
FIG. 4 is a flow diagram of a method in accordance with one embodiment of the present invention.

Referring now to FIG. 4, shown is a flow diagram of a method in accordance with an embodiment of the present invention. Method 200 may be implemented using, at least in part, control logic 176 of writeback stage 170 shown in FIG. 3. Method 200 may begin by receiving result data from an execution stage (block 210). First it may be determined whether the incoming result data is data of a single operation (i.e., data generated from a single instruction) or multiple operations (diamond 220).

If the result data is from a single instruction, control passes to block 230. At block 230, the result data may be stored in a buffer associated with a particular latency. That is, the result data may be stored in a buffer of the writeback stage that corresponds to the latency incurred in performing the instruction. For example, an instruction latency of three cycles may be stored in a buffer of the writeback stage that corresponds to three cycle instructions. However, in some embodiments if a write that is input to the writeback stage can be output in the same cycle, the buffers may be bypassed and the result data may be written directly to the resource that is to receive the data. If the result data is to be stored in the buffers, an entry in a pointer FIFO corresponding to the buffer location may also be stored (block 240). Storage of the pointer may occur simultaneously with storing the result data in the associated buffer, in some embodiments.

The writeback stage also may determine whether an overflow condition may occur in a next cycle. Accordingly, the writeback stage may look ahead to result data that will be incoming to the writeback stage in a next cycle (block 250). For example, control logic may monitor the execute stage to determine the number of writes that are to be requested in the next cycle. To do so, the writeback stage may determine a number of branches in the corresponding execute stage that will generate result data. Furthermore, the writeback stage may determine the latency associated with each of the instructions that will generate the result data in the different branches.

Referring still to FIG. 4, thus it next may be determined if any of the buffers could exceed their capacity upon receipt of the next cycle's results (diamond 260). For example, if a buffer corresponding to a three-cycle latency instruction is full and an available storage location will not be available in the next cycle, and result data corresponding to a three-cycle latency instruction will be incoming, at least one of the buffers would exceed its storage capacity. If the number of writes to be requested for the result data can potentially exceed the storage space in at least one of the write buffers, a stall may be generated. This stall signal may subsequently stall the pipeline in the following cycle. Accordingly, the writeback stage may generate a stall signal (block 270). The stall signal may be provided to the associated execute stage, as well as previous pipeline stages, for example, fetch and decode stages. The pipeline may remain stalled until the overflow condition is alleviated. Control then returns to block 210. If instead at diamond 260, it is determined that none of the buffers would exceed their capacity, control may return to block 210 for receiving the result data from the next cycle.

By performing the look ahead to the next cycle's results, the pipeline may be optimally stalled only when absolutely necessary. For example, one or more of the write buffers may be full, but if there is no following instruction that will need an allocation to the full buffer(s), the pipeline may continue operation without a stall being generated. In such manner, better performance may be obtained, particularly compared with a mechanism that would stall the pipeline whenever a buffer of the writeback stage is filled. Furthermore, by performing a look ahead the stall can be signaled a cycle later. This allows the writeback stage to register the stall signal so that it is available early in the cycle to the other pipeline stages. This feature enables the pipeline to run at higher clock speeds by making it easer to reach timing convergence. When the stall signal is registered, the writeback stage does not stall requests that have already been received. If there is no storage space in an associated buffer to store the requested write, the write may be dropped. In some embodiments, the look-ahead mechanism may be scalable with a tradeoff between buffer size and pipeline stalls.

Still referring to FIG. 4, if at diamond 220 it is determined that multiple result data is incoming in a single cycle, control passes to block 275. There, a priority may be determined for each of the multiple result data in program order (block 275). For example, result data corresponding to the longest latency instruction may be given a highest priority and so forth. Then, the multiple result data may be stored in buffers associated with the respective instruction latencies (block 280). Furthermore, entries in the pointer FIFO may be stored according to the determined priority (also block 280). That is, the pointer with the highest priority may be stored first in the pointer FIFO and so forth. As shown in FIG. 4, from block 280 control passes to block 250, as described above.

In such manner, non-uniform pipeline latencies may be handled effectively, and without stalling a processor pipeline. By buffering result data in the writeback stage based on the latency of the issuing instruction, multiple writes to the writeback stage may be handled within a single cycle. Furthermore, the look-ahead mechanism may stall the pipeline only when an overflow condition would occur to at least one of the buffers of the writeback stage. Embodiments of the present invention may thus enable higher performance in the architecture by removing restrictions on an assembler and programmer. That is, operations that would otherwise create resource hazards may be programmed and performed.

Embodiments of the present invention may be implemented in many different processor types, including general-purpose microprocessors, digital signal processors (DSPs), image/media processors and the like. In certain embodiments used in connection with image/media processors, a system may take form of an imaging device such as a multi-function machine that can perform digital imaging, copying, scanning, faxing, e-mailing and the like.

Figure 5:
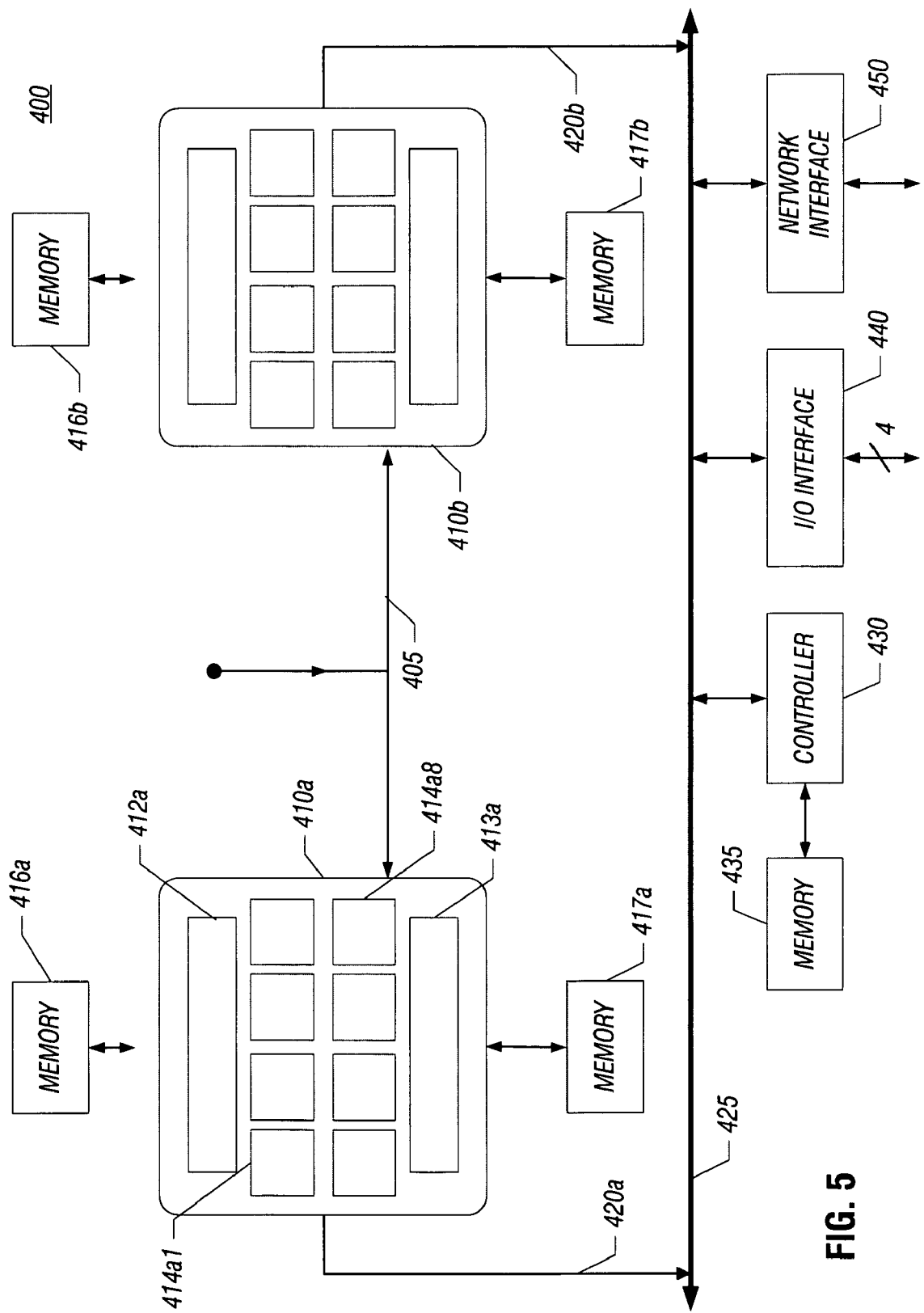
FIG. 5 is a block diagram of a portion of a system in accordance with an embodiment of the present invention.

Referring now to FIG. 5, shown is a block diagram of a portion of a system in accordance with one embodiment of the present invention. System 400 of FIG. 5 may be part of a digital imaging device and may be used to handle various processing tasks. As shown in FIG. 5, incoming data, which may be an input pixel stream, is provided on a bus 405 to a first processor 410a and a second processor 410b. As an example the input pixel stream may be obtained from a scanner or other capture device associated with system 400. While shown with two processors in the embodiment of FIG. 5, it is to be understood that the scope of the present invention is not so limited. Processor 410a may include a plurality of individual processing engines $414a_1$-$414a_8$ (generically processing engines 414). While shown with eight individual processing engines, the scope of the present invention is not so limited. The processing engines 414 may be MIMD engines connected by a streaming mesh, in one embodiment. As an example and without limitation, each processing engine may include multiple processing units, local memory, a register file, hardware accelerators, and the like. Also one or more of the processing engines may include a writeback stage in accordance with one embodiment of the present invention.

Processing engines 414 may be coupled through a first interface 412a and a second interface 413a to a first memory 416a and a second memory 417a. In one embodiment, memories 416a and 417a may be double data rate (DDR) random access memory (RAM), although the scope of the present invention is not so limited. For example, other forms of dynamic RAMs (DRAMs), static RAMs (SRAMs), or other memory technologies such as a flash memory may be implemented. Similar components are present in processor 410b, which is coupled to memories 416b and 417b.

As further shown in FIG. 5, the outputs of processors 410a and 410b may be coupled via output lines 420a and 420b respectively, to a bus 425. In turn, bus 425 may be coupled to a controller 430, which may be used to control operation of the system. For example controller 430 may be used to download microcode, initialize registers, initialize memory channels and service interrupts. Controller 430 may be coupled to a memory 435. Bus 425 may be also coupled to an input/output (I/O) interface 440. I/O interface 440 may interface system 400 with various devices using different connections, such as a universal serial bus (USB) connection, an Institute of Electrical and Electronics Engineers (IEEE) 1394 bus, a parallel port, and a phone line, among other such connections. Furthermore, bus 425 may couple to a network (not shown in FIG. 5) via a network interface 450.

Embodiments may be implemented in a computer program. As such, these embodiments may be stored on a medium having stored thereon instructions which can be used to program a system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic RAMs (DRAMs) and static RAMs (SRAMs), erasable programmable read-only memories (EPROMs), electrically erasable programmable read-only memories (EEPROMs), flash memories, magnetic or optical cards, or any type of media suitable for storing or transmitting electronic instructions. Similarly, embodiments may be implemented as software modules executed by a programmable control device, such as a general-purpose processor, image processor, DSP, or a custom designed state machine.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a plurality of buffers of a writeback stage of a processor pipeline, wherein a first buffer of the plurality of buffers is capable of only storing a first instruction latency and a second buffer of the plurality of buffers is capable of only storing a second instruction latency, where the first and the second instruction latencies are different, wherein each of the plurality of buffers has a plurality of storage locations each to store result data for an executed instruction of the instruction latency, received via a result channel coupled between an execute stage of the processor pipeline and the writeback stage, resulting from the instruction execution in the processor pipeline having the instruction latency;

a pointer storage of the writeback stage to store pointers, wherein each of the result data stored in one of the plurality of buffers has a corresponding pointer stored in the pointer storage;

logic of the writeback stage to generate a stall signal to be provided to the processor pipeline to stall the processor pipeline if a number of writes to be written to the plurality of buffers in a next cycle may exceed a capacity of at least one of the plurality of buffers, based on look ahead information received via a look-ahead channel coupled between the execute stage and the writeback stage; and a resource coupled to the plurality of buffers to receive the data therefrom.

2. The apparatus of claim 1, wherein the resource comprises a register file.

3. The apparatus of claim 1, wherein the pointers are to indicate an order in which stored data in the plurality of buffers is to be output by the writeback stage.

4. A method comprising:

storing a data result from an execution stage of a processor pipeline into one of a plurality of buffers of a writeback stage of the processor pipeline, wherein a first buffer of the plurality of buffers is capable of only storing a first instruction latency and a second buffer of the plurality of buffers is capable of only storing a second instruction latency, where the first and the second instruction latencies are different, wherein each of the plurality of buffers has a plurality of storage locations each to store a data result of an instruction having the corresponding instruction latency;

writing a pointer associated with the data result into a pointer storage including a plurality of entries, wherein every data result stored in the plurality of buffers has a corresponding pointer stored in the pointer storage;

monitoring the execution stage from the writeback stage for look-ahead information via a second channel coupled between the writeback stage and the execution stage, the second channel separate from a first channel to communicate the data result, to determine a number of writes to be requested in a next cycle; and generating a stall in the writeback stage based on the look-ahead information if the number of writes could exceed a capacity of at least one of the plurality of buffers.

5. The method of claim 4, further comprising storing multiple data results from the execution stage into corresponding ones of the plurality of buffers in a single cycle.

6. The method of claim 5, further comprising first writing a first pointer corresponding to the one of the multiple data results generated from a longest latency instruction into the pointer storage, and second writing a second pointer corresponding to the one of the multiple data results generated from a second longest latency instruction into the pointer storage.

7. The method of claim 5, further comprising storing the multiple data results without stalling the processor pipeline.

8. The method of claim 5, further comprising outputting a selected one of the multiple data results from the writeback stage to a resource according to information in the selected one of the plurality of buffers.

9. A system comprising:

a processor including:

an execution stage to execute instructions; and a writeback stage coupled to the execution stage to store multiple data results obtained from the execution stage in a single cycle via a data channel coupled between the execution stage and the writeback stage, the writeback stage including a plurality of buffers, wherein a first buffer of the plurality of buffers is capable of only storing a first instruction latency and a second buffer of the plurality of buffers is capable of only storing a second instruction latency, where the first and the second instruction latencies are different, each of the plurality of buffers having multiple locations each to store resulting data for an instruction having the corresponding instruction latency, and logic to generate a stall signal to stall the processor if a number of writes to be written to the plurality of buffers in a next cycle may exceed a capacity of at least one of the plurality of buffers; and a dynamic random access memory coupled to the processor.

10. The system of claim 9, further comprising a pointer buffer to store priority information to indicate a next buffer of the plurality of buffers from which to output a stored data result.

11. The system of claim 10, wherein the priority information is based on a latency of instructions that generate the multiple data results.

12. The system of claim 9, wherein the logic is to generate a stall signal ahead of a cycle in which a capacity of the at least one of the plurality of buffers may be exceeded.

13. The system of claim 9, wherein the execution stage includes an arithmetic logic unit and a multiply accumulate unit.

14. The system of claim 13, wherein the execution stage further includes a mode unit to perform a store accumulate instruction.

15. The system of claim 9, wherein the processor comprises a plurality of multiple instruction multiple data engines each having a plurality of processing units, at least one of which includes the writeback stage and the execution stage.

16. The apparatus of claim 1, wherein the logic is to stall the processor pipeline if a write for an instruction having the first instruction latency is to occur in the next cycle and the buffer of the plurality of buffers associated with the first instruction latency is full in a current cycle.

17. The apparatus of claim 16, wherein the logic is to prevent the stall of the processor pipeline if the write is to occur in the next cycle and the buffer is not full in the current cycle, wherein at least another of the plurality of buffers is full in the current cycle.

18. The apparatus of claim 3, wherein the logic is to store in the pointer storage, in a single cycle, a first pointer associated with a first instruction having the first instruction latency followed by a second pointer associated with a second instruction having the second instruction latency, wherein the second instruction latency is shorter than the first instruction latency.

19. The system of claim 9, wherein the logic is to generate a stall signal if a write for an instruction having the first instruction latency is to occur in the next cycle and the buffer of the plurality of buffers associated with the first instruction latency is full in a current cycle.

20. The system of claim 19, wherein the logic is to prevent the stall signal if the write is to occur in the next cycle and the buffer is not full in the current cycle, wherein at least another of the plurality of buffers is full in the current cycle.

21. The system of claim 10, wherein the pointer buffer is to store, in a single cycle, a first pointer associated with a first instruction having the first instruction latency followed by a second pointer associated with a second instruction having the second instruction latency, wherein the second instruction latency is shorter than the first instruction latency.

22. The apparatus of claim 1, wherein when multiple result data are to be stored in the writeback stage in a single cycle, a first pointer corresponding to the result data for a higher latency instruction is stored in the pointer storage before a second pointer corresponding to the result data for a lower latency instruction is stored in the pointer storage.

* * * * *